(12) United States Patent
Fiene et al.

(10) Patent No.: US 8,231,792 B2
(45) Date of Patent: Jul. 31, 2012

(54) PURIFICATION OF IONIC LIQUIDS

(75) Inventors: Martin Fiene, Niederkirchen (DE); Harald Rust, Neustadt (DE); Klemens Massonne, Bad Dürkheim (DE); Veit Stegmann, Mannheim (DE); Oliver Huttenloch, Ispringen (DE); Jörg Heilek, Bammental (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 628 days.

(21) Appl. No.: 11/720,937

(22) PCT Filed: Dec. 6, 2005

(86) PCT No.: PCT/EP2005/013061
§ 371 (c)(1),
(2), (4) Date: Jun. 6, 2007

(87) PCT Pub. No.: WO2006/061188
PCT Pub. Date: Jun. 15, 2006

(65) Prior Publication Data
US 2009/0250409 A1  Oct. 8, 2009

(30) Foreign Application Priority Data
Dec. 7, 2004  (DE) .................. 10 2004 058 907

(51) Int. Cl.
*B01D 9/00*  (2006.01)
(52) U.S. Cl. ......... 210/714; 23/296; 23/302 R; 210/737; 210/773; 210/774

(58) Field of Classification Search .................. 210/737
See application file for complete search history.

(56) References Cited

U.S. PATENT DOCUMENTS

| | | | |
|---|---|---|---|
| 3,597,164 A | 8/1971 | Ab-Der-Halden | |
| 5,329,021 A * | 7/1994 | Cohen et al. | 548/543 |
| 5,504,247 A | 4/1996 | Saxer et al. | |
| 5,710,284 A | 1/1998 | Schmidt-Radde et al. | |
| 5,755,975 A | 5/1998 | Eck et al. | |
| 6,991,718 B2 * | 1/2006 | Moulton | 205/413 |
| 2006/0036043 A1 | 2/2006 | Nestler et al. | |
| 2008/0083606 A1 | 4/2008 | Volland et al. | |

FOREIGN PATENT DOCUMENTS

| | | |
|---|---|---|
| DE | 195 36 792 A1 | 4/1997 |
| DE | 195 36 859 A1 | 4/1997 |
| DE | 102 02 838 | 8/2003 |
| DE | 102 57 449 A1 | 11/2003 |
| EP | 0 694 517 A1 | 1/1996 |
| EP | 0 616 998 B1 | 5/1996 |

OTHER PUBLICATIONS

Paul J. Dyson, et al., "Transition Metal Catalysed Reactions in Room-Temperature Ionic Liquids", Electrochemical Society Proceedings, vol. 99-41, 1 front page, pp. 161-168.

(Continued)

Primary Examiner — Peter A Hruskoci
(74) Attorney, Agent, or Firm — Oblon, Spivak, McClelland, Maier & Neustadt, L.L.P.

(57) ABSTRACT

The invention relates to a process for purifying an ionic liquid, which comprises the steps (a) partial crystallization of the ionic liquid from its melt and (b) separation of the crystals from the residual melt.

8 Claims, 3 Drawing Sheets

OTHER PUBLICATIONS

Joan F. Brennecke, et al., "Ionic Liquids: Innovative Fluids for Chemical Processing", AIChE Journal, vol. 47, No. 11, Nov. 2001, pp. 2384-2389.
James H. Davis, Jr., "Ionic Liquids Derived from Natural Products and Other Novel Chemistries", Sci. Ser., II 92, 2003, pp. 385-399.
D. W. Rooney, et al., "21.2 Ionic Liquids", Handbook of Solvents, Chem. Tech., 2001, 1 front page, pp. 1459-1484.
Peter Wasserscheid, et al., "Ionic Liquids in Synthesis", WIYLEY-VCH, 2003, 1 front page, pp. 43-44.
Jonathan G. Huddleston, et al., "Characterization and comparison of hydrophilic and hydrophobic room temperature ionic liquids incorporating the imidazolium cation", Green Chemistry, vol. 3, 2001, pp. 156-164.
Zaworotko et al, Acta Cytst. (1989), C45, pp. 996-1002.
Philipp Koelle et al, Eur. J. Inorg, Chem, (2004), pp. 2313-2320.
Holbrey et al, Dalton Trans. (2004) p. 2267-2271.
Wasserscheid et al, "Ionic Liquid in Synthesis", Wiley-VCH, p. 39-55.
Wilkes et al, J. Chem. Soc. Chem. Commun., (1992), pp. 965-967.
Elaiwi et al, J. Chem. Soc., Dalton Trans (1995), pp. 3467-3472.
Hofmann, "Kristallisation in der industriellen Praxis", Wiley-VCH, (2004) p. 247-262.
Holbrey et al, J. Chem Soc., Dalton Trans. (1999), p. 2133-2139.
Xu et al, J. Phys. Chem. B, (2003), vol. 107(25), pp. 6170-6178.
Gordon et al, J. Mater. Chem., (1998), vol. 8, pp. 2627-2636.
Armarego et al, Purification of Laboratory Chemicals, 5$^{th}$ ed., pp. 14-17.
Ultrich et al, J. of Therm. Anal., (1997), vol. 48, pp. 527-533.
Handbook of Separation Process Tech., edited by Rousseau, pp. 630-632.
Arkenbout, Melt Crystallization Tech., p. 176-177.
S. Carda-Broch, et al., Anal Bioanal Chem, vol. 375, pp. 191-199 (2003).
J.D. Holbrey, et al., "Crystal polymorphism in 1-butyl-3-methylimidazolium halides: supporting ionic liquid formation by inhibition of crystallization", The Royal Society of Chemistry, 2 pages (2003).

* cited by examiner

Figure 1

| RT | Height | Area | Area % |
|---|---|---|---|
| 3.227 | 122.330 | 384.069 | 3.393 |
| 4.673 | 1.113 | 7.426 | 0.066 |
| 5.333 | 0.433 | 2.539 | 0.022 |
| 6.253 | 0.547 | 4.317 | 0.038 |
| 7.660 | 634.181 | 10,922.762 | 96.481 |

Figure 2

PURIFICATION OF IONIC LIQUIDS

The invention relates to a process for purifying ionic liquids.

Ionic liquids are becoming increasingly important as solvents, e.g. for carrying out chemical reactions. Peter Wasserscheidt, Chemie in unserer Zeit 37 (2003), No. 1, pages 52-63, gives an overview of the use of ionic liquids in multiphase catalysis. An advantage of the use of ionic liquids as solvents which is emphasized is that ionic liquids have virtually no measurable vapor pressure and, for this reason, solvent losses due to evaporation do not occur when they are used as solvents.

The advantage of ionic liquids having no measurable vapor pressure becomes a disadvantage when they are used as solvents in a process in which high-boiling byproducts which cannot be separated off again by distillation or extraction are formed.

When ionic liquids are used for carrying out chemical reactions, the purity of the ionic liquids used is of great importance. Impurities can, for example, have a generally adverse effect on the course of chemical reactions. Thus, for example, P. Tyson et al. in Electrochemical Society Proceedings, vol. 99-41, pages 161-168, refers to problems when chloride-containing ionic liquids are used in liquid phase hydrogenation and when carrying out the Suzuki reaction. There is therefore a need for ionic liquids having a high purity.

In the scientific literature, it is frequently mentioned that ionic liquids do not form crystalline phases.

J. F. Brennecke. E. J. Maginn, AIChE Journal 47 (2001), 2384, characterize ionic liquids as organic salts which have a high degree of asymmetry which hinders ordered packing and thus inhibits crystallization.

J. H. J. Davis, NATO Sci. Ser. II, 92 (2003), 385, points out that one or both ions in ionic liquids are usually large, polyatomic species having a diffuse charge distribution and generally a low symmetry.

D. W. Rooney, K. R. Seddon, Handbook of Solvents, edited by G. Wypych, Chem. Tech. Publishing 2001, Chapter 21.2: "Ionic Liquids", describe phase diagrams of ionic liquids. These show a very complex phase behavior with mesomorphic-crystalline, liquid-crystalline, glass-like and liquid regions.

P. Wasserscheid, T. Welton, Ionic Liquids in Synthesis, Wiley-VCH, Weinheim 2003, Chapter 3.1.2.1, point out that typical ionic liquids form glass-like structures on cooling. R. D. Rogers et al., Green Chemistry 3 (2001), 156, point out that ionic liquids tend to undergo some cooling and frequently form amorphous structures in the solid state.

For the purposes of the present invention, ionic liquids are salts which are present in the liquid state even at low temperatures, preferably below 100° C.

It is an object of the present invention to provide a process for purifying ionic liquids which can readily be implemented in the industry and is simple to carry out. A particular object is to provide a process of this type by means of which high-boiling compounds, too, can be separated off from the ionic liquids.

This object is achieved by a process for purifying an ionic liquid, which comprises the steps (a) partial crystallization of the ionic liquid from its melt and (b) separation of the crystals from the residual melt.

It has surprisingly been found that ionic liquids can, contrary to generally promoted teachings, be crystallized from their melt with a good purifying action.

Processes for purifying substances by partial crystallization from the melt are known per se. The partial crystallization leads to the crystals having a reduced concentration of the impurity which remains in the residual melt and is separated from the crystals together with this melt. The crystallization of the melt is a separation process which proceeds at low temperatures and is thus thermally mild.

The partial crystallization according to the invention of the ionic liquids and the separation of the crystals from the residual melt can be carried out without restriction by means of known melt crystallization processes. Suitable processes are disclosed in the documents DE 195 36 792 A1, DE 195 36 859 A1, the documents cited in DE 102 57 449 A1 on page 4, lines 6 and 7, EP 0 616 998 B1 and U.S. Pat. No. 3,597,164. The pressure in the crystallization can be from 0.01 to 1000 bar, preferably from 0.1 to 50 bar and particularly preferably from 0.8 to 2 bar. The temperature in the crystallizing ionic liquid is in the range from 0.1 to 80 kelvin, preferably in the range from 1 to 40 kelvin, particularly preferably in the range from 2 to 20 kelvin, below the melting point of the pure ionic liquid.

The ionic liquids to be purified by the process of the invention usually have a content of impurities of from 1 to 60% by weight, preferably from 2 to 40% by weight and particularly preferably from 5 to 25% by weight. Typical impurities are substances having a low vapor pressure, high-boiling substances, oligomeric and polymeric compounds.

Ionic liquids having purities of from 85 to 99.999% by weight, preferably from 90 to 99.99% by weight and particularly preferably from 95 to 99.9% by weight, are obtained by the process of the invention.

In general, the ionic liquid is allowed to crystallize until at least 5% by weight, preferably at least 10% by weight and particularly preferably at least 20% by weight, of the ionic liquid has crystallized out. Typically not more than 90% by weight, preferably not more than 80% by weight and in particular not more than 70% by weight of the ionic liquid used is allowed to crystallize out in order to achieve a satisfactory purifying action.

The crystallization is preferably induced by means of a seeding procedure. In a particular embodiment of this seeding procedure, the liquid remaining as residual film on the cooling surfaces after melting-off is partially or completely frozen out as seed crystals on the cooling surface and a crystallization is then carried out again. The seed crystals can also be produced by the cooling surface being brought into contact with a purer, based on the ionic liquid to be purified, melt of the ionic liquid in a separate step and forming a layer of seed crystals by allowing to cool. Here too, the residual film of ionic liquid remaining on the cooling surfaces is partially or completely frozen out by reducing the temperature on the surfaces. It is also possible to produce a seed crystal layer by bringing the cooling surface into contact with a crystal-containing suspension of the ionic liquid so as to obtain a seed crystal layer by cooling of the cooling surface after removal of the suspension. Seeding can likewise be achieved by addition of crystals as solid or as suspension to the melt of the ionic liquid which is at a temperature close to or below the melting point. Seeding can also be achieved by producing a crystal layer on a locally restricted, separately cooled cooling surface (cold spot).

The purification process of the invention can be carried out as a static melt crystallization. Static crystallization is a discontinuous process in which the liquid phase (melt) is at rest or moved only by free convection during the crystallization in a static crystallizer. The crystals are formed on or in the vicinity of cooling surfaces in the crystallizer. These cooling surfaces can have any shape. One or more cooling surfaces can be present. The cooling surfaces are preferably cylindrical cooling surfaces, e.g. tubes, or flat cooling surfaces, e.g. plates. The cooling surfaces can be smooth, profiled or provided with fins. Apart from the cooling surfaces, further internals can be present in the crystallizer to support/hold the crystals.

The partial crystallization of the ionic liquid is achieved by cooling the contents of the crystallizer by from a few kelvin to a number of 10 s kelvin, generally over a period of from a few hours to a few days. After the partial crystallization, the residual melt and the crystals are separated, generally by simply allowing the residual melt to run off over a period of up to a number of hours. This can be followed by a washing or sweating process for from a plurality of hours to a plurality of days in order to achieve further purification of the crystals. In the washing/sweating, the temperature of the crystals is maintained between the final crystallization temperature and the melting point of the pure ionic liquid. During sweating, generally from 1 to 60% by weight, preferably from 5 to 50% by weight and particularly preferably from 10 to 40% by weight, of the crystals produced initially is melted again. After washing/sweating, the purified crystals can be melted off by heating to temperatures above the melting point (1-50 kelvin, preferably 5-30 kelvin, above the melting point) and obtained as liquid.

In a preferred embodiment, the process of the invention is carried out as a dynamic melt crystallization. In dynamic melt crystallization, the liquid phase is moved by forced convection during the crystallization. Forced convection can be achieved by forced flow in apparatuses which are full of liquid or by a trickling or falling film being applied to a cooled wall. In dynamic crystallization, the crystals, e.g. in the form of a crystal layer, can likewise be moved through the melt.

The dynamic crystallization can be carried out as a dynamic layer crystallization. The dynamic layer crystallization can be carried out continuously or discontinuously.

The way in which the continuous dynamic layer crystallization is carried out is not subject to any restrictions. Preference is given to using moving cooling surfaces such as cooling belts or cooling rollers.

The way in which the discontinuous dynamic layer crystallization is carried out, preferably as a falling film layer crystallization or as a layer crystallization in a crystallizer in the form of the flow tube full of liquid, is not subject to any restrictions. The dynamic layer crystallization on static cooling surfaces can be carried out as follows: the crystals of the ionic liquid are applied to the cooling surface by bringing the cooling surface into contact with a liquid mixture comprising the ionic liquid to be purified and forming the corresponding crystals by cooling of the cooling surface. To form the crystals, the cooling surface is preferably cooled to a temperature in the temperature range from the melting point of the solid ionic liquid to 60 K below this, preferably 40 K below this. When the desired mass of crystals has been obtained, the cooling process is stopped. The noncrystalline residual liquid enriched in the impurity can then be conveyed away and thus removed from the cooling surfaces or the crystals formed. The residual liquid can be conveyed by simply allowing it to flow away or by pumping it away.

A washing and/or sweating step can then be carried out. In the case of washing, the crystals which are grown on the cooling surfaces are brought into contact with a washing liquid and separated off from this again. The residual liquid remaining on the crystals is in this way replaced by the purer washing liquid. Particularly when the residence time of the washing liquid on the crystals is relatively long, diffusive exchange of impurities occurs between the relatively pure washing liquid and less pure regions of the crystals. As washing liquid, preference is given to using the pure melt of the ionic liquid. In the case of sweating, the residual liquid is conveyed away and the temperature of the crystals on the cooling surface is then increased to a value between the freezing point of the residual melt and the melting point of the pure ionic liquid. Sweating is particularly advantageous when the crystals of the ionic liquid are not present as a compact crystal layer but as a porous aggregation with many inclusions. During sweating, it is usual for from 1 to 30% by weight, preferably from 2 to 20% by weight and particularly preferably from 3 to 15% by weight, of the crystals produced initially to be melted. The crystals can then be liquefied by heating and the resulting liquid which has been depleted in the impurity can be conveyed away, e.g. once again by simply allowing it to flow away or by pumping away. The liquefaction of the crystals is preferably carried out in a temperature range from the melting point of the respective ionic liquid to 50 K above this, in particular 30 K above this.

The cooling surfaces used in the dynamic layer crystallization are not subject to any restriction and can have any shape. It is possible to use one or more cooling surfaces.

Preference is given to using cylindrical cooling surfaces, e.g. tubes, or flat cooling surfaces. The cooling surfaces can be smooth or profiled. Here, the cooling surfaces can either be completely immersed in the melt from which the ionic liquid is partially crystallized or a trickling film of this liquid can be passed over them, e.g. in a tube full of liquid flowing through it or in a tube through or over which a trickling film flows. The cooling surfaces can also be parts of a heat exchanger provided with an inlet and an outlet.

The dynamic melt crystallization is particularly preferably carried out as a suspension crystallization. The dynamic suspension crystallization can be carried out continuously or discontinuously. Suitable crystallizers are, for example, stirred tank crystallizers and cooling disc crystallizers, scraped coolers with forced circulation, bubble column crystallizers and crystallization columns.

Suspension crystallization is a crystallization process in which single crystals are formed from a generally solids-free, liquid multicomponent system as starting material present as a melt by removal of heat in the bulk of the starting material. The crystal suspension comprising residual melt and dispersed single crystals is kept in motion during the suspension crystallization, which can be achieved, in particular, by pumped circulation or stirring. Adhesion of crystals to surfaces is not necessary here, and is even undesirable. Since the crystal suspension is kept in motion, suspension crystallization is regarded as a dynamic crystallization process.

In suspension crystallization, the heat is removed by indirect cooling by means of scraped coolers which are connected to a stirred vessel or a container without a stirrer. The circulation of the crystal suspension is achieved by means of a pump. It is also possible to remove the heat via the wall of a stirred vessel using a stirrer which either travels around the wall or does not travel around the wall. A particularly preferred embodiment of suspension crystallization comprises the use of cooling disc crystallizers which are produced, for example, by GMF (Gouda in Holland). In a further suitable variant of suspension crystallization by cooling, the heat is removed via conventional heat exchangers (preferably shell-and-tube heat exchangers or plate heat exchangers). In contrast to scraped coolers, stirred vessels with stirrers traveling around the wall or cooling discs, these apparatuses have no devices for avoiding crystal layers on the heat-transferring surfaces. If a state in which the heat transfer resistance becomes too high due to encrustation is reached during operation, the crystallization process is switched over to a second apparatus. During operation of the second apparatus, the first apparatus is regenerated (preferably by melting-off of the crystal layer or flushing of the apparatus with superheated melt). If an unacceptably high heat transfer resistance is reached in the second apparatus, the crystallization process is switched back over to the first apparatus, and so forth. This variant can also be carried out using more than two apparatuses in alternate operations.

Cooling of the crystallizing ionic liquids can also be effected by direct cooling, e.g. by introduction of a cold gas, a cold, preferably nonpolar liquid or a vaporizing, preferably nonpolar liquid into the crystallizing ionic liquid. In the case of liquids, preference is given to using ones which are immiscible or only sparingly miscible with the ionic liquids.

The suspension crystallization, in particular the discontinuous suspension crystallization, is preferably induced by means of a seeding procedure. Seeding can be achieved by addition of crystals as solid or as suspension to the melt of the ionic liquid, with the melt of the ionic liquid then being at a temperature close to or below the melting point of the ionic liquid at the time of addition. The crystals added can be specifically treated, e.g. comminuted and/or washed. Seeding can also be achieved by production of a crystal layer on a locally restricted, separately cooled cooling surface (cold spot). Seed crystals can also be removed from such a separately cooled surface (e.g. mechanically, by means of flow forces or by means of ultrasound) and introduced into the melt of the ionic liquid.

Seeding of the crystallization can also be achieved by firstly cooling the liquid ionic liquid to a low temperature until crystal formation occurs spontaneously or when an above-described seeding procedure is employed, then increasing the temperature of the suspension again so as to remelt a large part of the crystals formed and subsequently cooling the suspension more slowly and in a targeted manner in the presence of the remaining crystals (seed crystals) so as to produce the desired suspension.

The separation of the suspension obtained after the dynamic crystallization can be carried out using all known methods of solid-liquid separation. The crystals are preferably separated off from the residual melt by filtration, sedimentation and/or centrifugation. However, it is also possible to remove the residual melt from the then preferably static crystals by, for example, allowing it to run off. The filtration, sedimentation or centrifugation is advantageously preceded by a preliminary thickening of the suspension, e.g. by means of hydrocyclones. All known centrifuges which operate discontinuously or continuously are suitable for centrifugation. It is particularly advantageous to use pusher centrifuges which can be operated in one or more stages. Also suitable are screw screen centrifuges or screw discharge centrifuges (decanters). Filtration is advantageously carried out by means of pressure or suction filters which are operated continuously or discontinuously, with or without a stirrer, or by means of belt filters. In general, filtration can be carried out under pressure or under reduced pressure. Further process steps for increasing the purity of the crystals or the crystal cake can be provided during and/or after the solid-liquid separation. In a particularly advantageous embodiment of the invention, the separation of the crystals from the residual melt is followed by single-stage or multistage washing and/or sweating of the crystals or the crystal cake. The washing liquid is in this case not subject to any restriction. However, washing is advantageously carried out using pure material, i.e. a liquid whose purity is higher than that of the residual melt. Washing can be carried out in apparatuses customary for this purpose, e.g. washing columns in which the removal of the residual melt and washing occur in one apparatus, in centrifuges which can be operated in one or more stages, or in pressure or suction filters or belt filters. Washing can be carried out in one or more stages on centrifuges or belt filters, with the washing liquid being able to be conveyed in countercurrent to the crystal cake. In addition, sweating can be provided to increase the purity of the crystals. This involves local melting-off of contaminated regions. In the case of suspension crystallization, sweating is particularly preferably carried out on centrifuges or belt filters, but it can also be useful to carry out a combination of washing and sweating in one apparatus.

The apparatuses used for the solid-liquid separation, washing and in particular sweating of the crystals are heated externally and/or internally and/or are exposed to a heated gas. The heating temperature is chosen so as to be in a temperature range above the crystallization temperature, generally from 1 to 60 K, preferably from 2 to 30 K, above the crystallization temperature of the ionic liquid.

As washing liquid for the crystals of a given crystallization stage, it is possible to use the feed to the same crystallization stage. In this case, the mass ratio of washing liquid to crystals is set in the range from 0.05 to 1 kg, particularly preferably in the range from 0.1 to 0.6 kg, of washing liquid per kg of crystals. This mass ratio can also be set when using other washing liquids. The washing liquid used is particularly preferably previously purified ionic liquid obtained by the process of the invention after melting of the crystals which have been separated off and purified further by washing and/or sweating. The temperature of the washing liquid is preferably in a temperature range above the crystallization temperature, in general from 1 to 30 K above the melting point of the ionic liquid.

The crystals of the ionic liquids which have been separated off and purified do not have to be liquefied by melting. The crystals can likewise be dissolved in a suitable solvent.

The partial crystallization of the ionic liquids according to the invention can be carried out in one or more stages. Here, a plurality of crystallization stages carried out discontinuously or continuously can be arranged in series, with the individual stages also being able to involve a number of different crystallization methods (for example static and dynamic, suspension or layer crystallization). In a preferred embodiment of the process of the invention, the crystallization is carried out in a plurality of stages as a fractional crystallization. In a fractional crystallization, it is customary to refer to all stages above the introduction of the starting mixture, i.e. in the direction of purer mixtures, as purification stages and to refer to all other stages, i.e. below the introduction of the starting mixture, as stripping stages. Multistage crystallization processes are advantageously operated according to the countercurrent principle, according to which the crystals from each stage are, after the residual melt has been separated off, passed to the stage having the next higher degree of purity, while the crystallization residue, i.e. the residual melt, is passed to the stage having the next lower degree of purity. In such a case, the crystallization stages are usually referred to as higher or lower crystallization stages according to the degree of purity of the respective crystals. Accordingly, the stripping stage which produces the crystals or residual melt having the lowest degree of purity is referred to as the bottommost crystallization stage while the purification stage having the highest degree of purity is referred to as the uppermost stage.

Suitable crystallization apparatuses for carrying out the continuous fractional crystallization are countercurrent crystallization columns such as the Phillips column, the Schildknecht countercurrent column and also countercurrent columns having upper and bottom runback. The fractional crystallization can also be carried out by means of multistage layer crystallization (e.g. a combination of static and dynamic crystallization).

In a specific variant of the process of the invention, the partial crystallization of the ionic liquid is carried out as a zone melting process.

In the zone melting process according to the invention, the crystalline ionic liquid is introduced into a rod-shaped container or is itself brought into rod form and is moved relative to a narrow, annular heating zone which surrounds the rod, thus forming a narrow melt zone which migrates slowly through the rod and takes up the impurities. The zonewise heating of the crystalline ionic liquid in the form of a rod can, for example, be effected by resistance heating by means of heating elements arranged around the rod. Zonewise heating can also be effected by means of induction heating or by means of any further suitable heating methods. The migration velocity of the heating zone or melt zone is generally from 0.1 to 100 mm/h. It is also possible for a plurality of successive heating zones to be present, provided that these are sufficiently far apart for complete crystallization of the ionic liquid to take place between two successive melting steps. Complete crystallization of the ionic liquids after melting can be aided by cooling zones following the heating zones. These can be configured as, for example, coiled tubes through which a cooling medium flows.

For the purposes of the present invention, ionic liquids are salts of the general formula $$[A]_n^+[Y]^{n-}$$

where n= 1, 2, 3 or 4,
or mixed species of the general formula $$[A^1]^+[A^2]^+[Y]^{2-}, [A^1]^+[A^2]^+[A^3]^+[Y]^{3-} \text{ or } [A^1]^+[A^2]^+[A^3]^+[A^4]^+[Y]^{4-}$$

where $A^1$, $A^2$, $A^3$ and $A^4$ are selected independently from the groups mentioned for [A], or mixed species with metal cations $$[A^1]+[A^2]^+[A^3]^+[M^1]^+[Y]^{4-}, [A^1]^+[A^2]^+[M^1]^+[M^2]^+[Y]^{4-},$$

$$[A^1]^+[M^1]^+[M^2]^+[M^3]^+[Y]^{4-}, [A^1]^+[A^2]^+[M^1]^+[Y]^{3-}, [A^1]^+[M^1]^+[M^2]^+[Y]^{3-},$$

$$[A^1\alpha^+[M^1]^+[Y]^{2-}, [A^1]^+[A^2]^+[M^4]^{2+}[Y]^{4-}, [A^1]^+[M^1]^+[M^4]^{2+}[Y]^{4-},$$

$$[A^1]^+[M^5]^{3+}[Y]^{4-}, [A^1]^+[M^4]^{2+}[Y]^{3-}$$

where $M^1$, $M^2$, $M^3$ are monovalent cations, $M^4$ is a divalent metal cation and $M^5$ is a trivalent metal cation.

Compounds which are suitable for forming the cation $[A]_n^+$ of ionic liquids are, for example, known from DE 102 02 838 A1. Thus, such compounds can comprise oxygen, phosphorus, sulfur or in particular nitrogen atoms, for example at least one nitrogen atom, preferably 1-10 nitrogen atoms, particularly preferably 1-5 nitrogen atoms, very particularly preferably 1-3 nitrogen atoms and in particular 1-2 nitrogen atoms. If appropriate, further heteroatoms such as oxygen, sulfur or phosphorus can also be present. The nitrogen atom is a suitable carrier of the positive charge in the cation of the ionic liquid, from which a proton or an alkyl radical can then be transferred in equilibrium to the anion so as to produce an electrically neutral molecule.

In the synthesis of ionic liquids, a cation is firstly produced by quaternization of the nitrogen atom of, for example, an amine or nitrogen heterocycle. Quaternization can be effected by protonation or alkylation of the nitrogen atom. Depending on the protonation or alkylation reagent used, salts having different anions are obtained. In cases in which it is not possible to form the desired anion directly in the quaternization, it is introduced in a further step of the synthesis. For example, starting from an ammonium halide, the halide can be reacted with a Lewis acid to form a complex anion from the halide and Lewis acid. As an alternative, it is possible to replace a halide ion by the desired anion. This can be achieved by addition of a metal salt with precipitation of the metal halide formed, by means of an ion exchanger or by displacement of the halide ion by a strong acid (with liberation of the hydrogen halide). Suitable methods are described, for example, in Angew. Chem. 2000, 112, pp. 3926-3945, and the references cited therein.

Suitable alkyl radicals by which the nitrogen atom in the amines or nitrogen heterocycles is quaternized are $C_1$-$C_{18}$-alkyl, preferably $C_1$-$C_{10}$-alkyl, particularly preferably $C_1$-$C_6$-alkyl and very particularly preferably methyl.

Preference is given to compounds which comprise at least one five- or six-membered heterocycle which has at least one nitrogen atom and, if appropriate, an oxygen or sulfur atom; particular preference is given to compounds which comprise at least one five- or six-membered heterocycle which has one, two or three nitrogen atoms and/or a sulfur or oxygen atom, very particularly preferably those having two nitrogen atoms.

Particularly preferred compounds are ones which have a molecular weight of less than 1000 g/mol, very particularly preferably less than 500 g/mol and in particular less than 250 g/mol.

Preference is further given to cations selected from among the compounds of the formulae (Ia) to (It), (e)

(k')

(f)

(l)

(g)

(m)

(g')

(m')

(h)

(n)

(i)

(n')

(j)

(o)

(j')

(o')

(k)

(p)

and oligomers and polymers comprising these structures, where the substituents and indices have the following meanings:

R is hydrogen or a $C_1$-$C_{18}$-alkyl radical, preferably a $C_1$-$C_{10}$-alkyl radical, particularly preferably a $C_1$-$C_6$-alkyl radical, for example methyl, ethyl, n-propyl, isopropyl, n-butyl, sec-butyl, tert-butyl, n-pentyl (n-amyl), 2-pentyl (sec-amyl), 3-pentyl, 2,2-dimethylprop-1-yl (neopentyl) and n-hexyl, very particularly preferably methyl.

$R^1$, $R^2$, $R^3$, $R^4$, $R^5$ and $R^6$ are each, independently of one another, hydrogen, $C_1$-$C_{18}$-alkyl, $C_2$-$C_{18}$-alkyl which may be interrupted by one or more nonadjacent oxygen and/or sulfur atoms and/or one or more substituted or unsubstituted imino groups. $C_6$-$C_{14}$-aryl, $C_5$-$C_{12}$-cycloalkyl or a five- or six-membered, oxygen-, nitrogen- and/or sulfur-comprising heterocycle, where two of them may also together form an unsaturated, saturated or aromatic ring which may be interrupted by one or more nonadjacent oxygen and/or sulfur atoms and/or one or more substituted or unsubstituted imino groups, where the radicals mentioned may each be additionally substituted by functional groups, aryl, alkyl, aryloxy, alkyloxy, halogen, heteroatoms and/or heterocycles.

$C_1$-$C_{18}$-alkyl which may be substituted by functional groups, aryl, alkyl, aryloxy, alkyloxy, halogen, heteroatoms and/or heterocycles is, for example, methyl, ethyl, propyl, isopropyl, n-butyl, sec-butyl, tert-butyl, pentyl, hexyl, heptyl, octyl, 2-ethylhexyl, 2,4,4-trimethylpentyl, decyl, dodecyl, tetradecyl, heptadecyl, octadecyl, 1,1-dimethylpropyl, 1,1-dimethylbutyl, 1,1,3,3-tetramethylbutyl, benzyl, 1-phenylethyl, 2-2-dimethylbenzyl, benzhydryl, p-tolylmethyl, 1-(p-butylphenyl)ethyl, p-chlorobenzyl, 2,4-dichlorobenzyl, p-methoxybenzyl, m-ethoxybenzyl, 2-cyanoethyl, 2-cyanopropyl, 2-methoxycarbonylethyl, 2-ethoxycarbonylethyl, 2-butoxycarbonylpropyl, 1,2-di(methoxycarbonyl)ethyl, 2-methoxyethyl, 2-ethoxyethyl, 2-butoxyethyl, diethoxymethyl, diethoxyethyl, 1,3-dioxolan-2-yl, 1,3-dioxan-2-yl, 2-methyl-1,3-dioxolan-2-yl, 4-methyl-1,3-dioxolan-2-yl, 2-isopropoxyethyl, 2-butoxypropyl, 2-octyloxyethyl, chloromethyl, trichloromethyl, trifluoromethyl, 1,1-dimethyl-2-chloroethyl, 2-methoxyisopropyl, 2-ethoxyethyl, butylthiomethyl, 2-dodecylthioethyl, 2-phenylthioethyl, 2,2,2-trifluoroethyl, 2-hydroxyethyl, 2-hydroxypropyl, 3-hydroxypropy, 4-hydroxybutyl, 6-hydroxyhexyl, 2-aminoethyl, 2-aminopropyl, 3-aminopropyl, 4-aminobutyl, 6-aminohexyl, 2-methylaminoethyl, 2-methylaminopropyl, 3-methylaminopropyl, 4-methylaminobutyl, 6-methylaminohexyl, 2-dimethylaminoethyl, 2-dimethylaminopropyl, 3-dimethylaminopropyl, 4-dimethylaminobutyl, (6-dimethylaminohexyl, 2-hydroxy-2,2-dimethylethyl, 2-phenoxyethyl, 2-phenoxypropyl, 3-phenoxypropyl, 4-phenoxybutyl, 6-phenoxyhexyl, 2-methoxyethyl, 2-methoxypropyl, 3-methoxypropyl, 4-methoxybutyl, 6-methoxyhexyl, 2-ethoxyethyl, 2-ethoxypropyl, 3-ethoxypropyl, 4-ethoxybutyl or 6-ethoxyhexyl.

$C_2$-$C_{18}$-alkyl which may be interrupted by one or more nonadjacent oxygen and/or sulfur atoms and/or one or more substituted or unsubstituted imino groups is, for example, 5-hydroxy-3-oxapentyl, 8-hydroxy-3,6-dioxaoctyl, 11-hydroxy-3,6,9-trioxaundecyl, 7-hydroxy-4-oxaheptyl, 11-hydroxy-4,8-dioxaundecyl, 15-hydroxy-4,8,12-trioxapentadecyl, 9-hydroxy-5-oxanonyl, 14-hydroxy-5,10-oxatetradecyl, 5-methoxy-3-oxapentyl, 8-methoxy-3,6-dioxaoctyl, 11-methoxy-3,6,9-trioxaundecyl, 7-methoxy-4-oxaheptyl, 11-methoxy-4,8-dioxaundecyl, 15-methoxy-4,8,12-trioxapentadecyl, 9-methoxy-5-oxanonyl, 14-methoxy-5,10-oxatetradecyl, 5-ethoxy-3-oxapentyl, 8-ethoxy-3,6-dioxaoctyl, 11-ethoxy-3,6,9-trioxaundecyl, 7-ethoxy-4-oxaheptyl, 11 ethoxy-4,8-dioxaundecyl, 15-ethoxy-4,8,12-trioxapentadecyl, 9-ethoxy-5-oxanonyl or 14-ethoxy-5,10-oxatetradecyl.

If two radicals form a ring, they can together form as fused-on building block, for example, 1,3-propylene, 1,4-butylene, 2-oxa-1,3-propylene, 1-oxa-1,3-propylene, 2-oxa-1,3-propenylene 1-aza-1,3-propenylene, 1-$C_1$-$C_4$-alkyl-1-aza-1,3-propenylene, 1,4-buta-1,3-dienylene, 1-aza-1,4-buta-1,3-dienylene or 2-aza-1,4-buta-1,3-dienylene.

The number of nonadjacent oxygen and/or sulfur atoms and/or imino groups is in principle not subject to any restrictions or is automatically restricted by the size of the radical or the cyclic building block. In general, there will be no more than 5 in the respective radical, preferably no more than 4 and very particularly preferably no more than 3. Furthermore, there is generally at least one carbon atom, preferably at least two carbon atoms, between any two heteroatoms.

Substituted and unsubstituted imino groups can be, for example, imino, methylimino, isopropylimino, n-butylimino or tert-butylimino.

For the purposes of the present invention, the term "functional groups" refers, for example, to the following: carboxy, carboxamide, hydroxy, di($C_1$-$C_4$-alkyl)amino, $C_1$-$C_4$-alkyloxycarbonyl, cyano or $C_1$-$C_4$-alkyloxy. Here, $C_1$-$C_4$-alkyl is methyl, ethyl, propyl, isopropyl, n-butyl, sec-butyl or tert-butyl.

$C_6$-$C_{14}$-Aryl which may be substituted by functional groups, aryl, alkyl, aryloxy, alkyloxy, halogen, heteroatoms and/or heterocycles is, for example, phenyl, tolyl, xylyl, α-naphthyl, β-naphthyl, 4-diphenylyl, chlorophenyl, dichlorophenyl, trichlorophenyl, difluorophenyl, methylphenyl, dimethylphenyl, trimethylphenyl, ethylphenyl, diethylphenyl, isopropylphenyl, tert-butylphenyl, dodecylphenyl, methoxyphenyl, dimethoxyphenyl, ethoxyphenyl, hexyloxyphenyl, methylnaphthyl, isopropylnaphthyl, chloronaphthyl, ethoxynaphthyl, 2,6-dimethylphenyl, 2,4,6-trimethylphenyl, 2,6-dimethoxyphenyl, 2,6-dichlorophenyl, 4-bromophenyl, 2- or 4-nitrophenyl, 2.4- or 2,6-dinitrophenyl, 4-dimethylaminophenyl, 4-acetylphenyl, methoxyethylphenyl or ethoxymethylphenyl.

$C_5$-$C_{12}$-Cycloalkyl which may be substituted by functional groups, aryl, alkyl, aryloxy, halogen, heteroatoms and/or heterocycles is, for example, cyclopentyl, cyclohexyl, cyclooctyl, cyclododecyl, methylcyclopentyl, dimethylcyclopentyl, methylcyclohexyl, dimethylcyclohexyl, diethylcyclohexyl, butylcyclohexyl, methoxycyclohexyl, dimethoxycyclohexyl, diethoxycyclohexyl, butylthiocyclohexyl, chlorocyclohexyl, dichlorocyclohexyl, dichlorocyclopentyl or a saturated or unsaturated bicyclic system such as norbornyl or norbornenyl.

A five- or six-membered, oxygen-, nitrogen- and/or sulfur-comprising heterocycle which may be substituted by the corresponding groups is, for example, furyl, thiophenyl, pyrryl, pyridyl, indolyl, dioxolyl, dioxyl, benzimidazolyl, benzothiazolyl, dimethylpyridyl, methylquinolyl, dimethylpyryl, methoxyfuryl, dimethoxypyridyl, difluoropyridyl, methylthiophenyl, isopropylthiophenyl or tert-butylthiophenyl.

Preference is given to $R^1$, $R^2$, $R^3$, $R^4$, $R^5$ and $R^6$ each being, independently of one another, hydrogen, methyl, ethyl, n-butyl, 2-hydroxyethyl, 2-cyanoethyl, 2-(methoxycarbonyl)ethyl, 2-(ethoxycarbonyl)ethyl, 2-(n-butoxycarbonyl)ethyl, dimethylamino, diethylamino or chlorine.

Particularly preferred pyridinium ions (Ia) are those in which one of the radicals $R^1$ to $R^5$ is methyl, ethyl or chlorine and all others are hydrogen, or $R^3$ is dimethylamino and all others are hydrogen, or all the radicals are hydrogen, or $R^2$ is carboxy or carboxamide and all others are hydrogen, or $R^1$ and $R^2$ or $R^2$ and $R^3$ are together 1,4-buta-1,3-dienylene and all others are hydrogen.

Very particularly preferred pyridinium ions (Ia) are those in which one of the radicals $R^1$ to $R^5$ is hydrogen, methyl or ethyl and all others are hydrogen.

Particularly preferred pyridazinium ions (Ib) are those in which one of the radicals $R^1$ to $R^4$ is methyl or ethyl and all others are hydrogen or all the radicals are hydrogen.

Particularly preferred pyrimidinium ions (Ic) are those in which $R^2$ to $R^4$ are each hydrogen or methyl and $R^1$ is hydrogen, methyl or ethyl, or $R^2$ and $R^4$ are each methyl, $R^3$ is hydrogen and $R^1$ is hydrogen, methyl or ethyl.

Particularly preferred pyrazinium ions (Id) are those in which $R^1$ to $R^4$ are each hydrogen or methyl and $R^1$ is hydrogen, methyl or ethyl, or $R^2$ and $R^4$ are each methyl, $R^3$ is hydrogen and $R^1$ is hydrogen, methyl or ethyl, or all the radicals are methyl or all the radicals are hydrogen.

Particularly preferred imidazolium ions (Ie) are those in which, independently of one another, $R^1$ is selected from methyl, ethyl, n-propyl, n-butyl, n-pentyl, 2-hydroxyethyl and 2-cyanoethyl a to $R^4$ are selected independently from among hydrogen, methyl and ethyl.

Particularly preferred pyrazolium ions (If) are those in which, independently of one another, $R^1$ is selected from among hydrogen, methyl and ethyl, and $R^2$, $R^3$ and $R^4$ are selected from among hydrogen and methyl.

Particularly preferred pyrazolium ions (Ig) and (Ig') are those in which, independently of one another, $R^1$ is selected from among hydrogen, methyl and ethyl and $R^2$, $R^3$ and $R^4$ are selected from among hydrogen and methyl.

Particularly preferred pyrazolium ions (Ih) are those in which, independently of one another, $R^1$ to $R^4$ are selected from among hydrogen and methyl.

Particularly preferred 1-pyrazolinium ions (Ii) are those in which, independently of one another, $R^1$ to $R^6$ are selected from among hydrogen and methyl.

Particularly preferred 2-pyazolinium ions (Ij) and (Ij') are those in which, independently of one another, $R^1$ is selected from among hydrogen, methyl, ethyl and phenyl and $R^2$ to $R^6$ are selected from among hydrogen and methyl.

Particularly preferred 3-pyrazolinium ions (Ik) are those in which, independently of one another. $R^1$ and $R^2$ are selected from among hydrogen, methyl, ethyl and phenyl and $R^3$ to $R^6$ are selected from among hydrogen and methyl.

Particularly preferred imidazolinium ions (Il) are those in which, independently of one another, $R^1$ and $R^2$ are selected from among hydrogen, methyl, ethyl, n-butyl and phenyl and $R^3$ and $R^4$ are selected from among hydrogen, methyl and ethyl and $R^5$ or $R^6$ are selected from among hydrogen and methyl.

Particularly preferred imidazolinium ions (Im) and (Im') are those in which, independently of one another, $R^1$ and $R^2$ are selected from among hydrogen, methyl and ethyl and $R^3$ to $R^6$ are selected from among hydrogen and methyl.

Particularly preferred imidazolinium ions (In) and (In') are those in which, independently of one another, $R^1$, $R^2$ and $R^3$ are selected from among hydrogen, methyl and ethyl and $R^4$ to $R^6$ are selected from among hydrogen and methyl.

Particularly preferred thiazolium ions (Io) and (Io') or oxazolium ions (Ip) are those in which, independently of one another. $R^1$ is selected from among hydrogen, methyl, ethyl and phenyl and $R^2$ and $R^3$ are selected from among hydrogen and methyl.

Particularly preferred 1,2,4-triazolium ions (Iq) and (Iq') and (Iq") are those in which, independently of one another. $R^1$ and $R^2$ are selected from among hydrogen, methyl, ethyl and phenyl and $R^3$ is selected from among hydrogen, methyl and phenyl Particularly preferred 1,2,3-triazolium ions (Ir), (Ir') and (Ir") are those in which, independently of one another, $R^1$ is selected from among hydrogen, methyl and ethyl and $R^2$ and $R^3$ are selected from among hydrogen and methyl or $R^2$ and $R^3$ are together 1,4-buta-1,3-dienylene and all others are hydrogen.

Particularly preferred pyrrolidinium ions (Is) are those in which, independently of one another. $R^1$ is selected from among hydrogen, methyl, ethyl and phenyl and $R^2$ to $R^9$ are selected from among hydrogen and methyl.

Particularly preferred imidazolidinium ions (It) are those in which, independently of one another, $R^1$ and $R^4$ are selected from among hydrogen, methyl, ethyl and phenyl and $R^2$ and $R^3$ and also $R^5$ to $R^8$ are selected from among hydrogen and methyl.

Among the abovementioned heterocyclic cations, the pyridinium ions and the imidazolinium ions are preferred.

Very particularly preferred cations are 1,3-$C_1$-$C_4$-dialkylimidazolium, 3-chloropyridinium, 4-dimethylaminopyridinium, 2-ethyl-4-aminopyridinium, 2-methylpyridinium, 2-ethylpyridinium, 2-ethyl-6-methylpyridinium, quinolinium, isoquinolinium, pyridinium, 1-$C_1$-$C_4$-alkylimidazolium, 1-methylimidazolium, 1,2-dimethylimidazolium, 1-n-butyl-imidazolium, 1,4,5-trimethylimidazolium, 1,4-dimethylimidazolium, imidazolium, 2-methylimidazolium, 1-butyl-2-methylimidazolium, 4 methylimidazolium, 1-(2'-aminoethyl)imidazolium, 1-vinylimidazolium, 2-ethylimidazolium and benzotriazolium, with these being quaternized on the nitrogen by the radical R. Very particular preference is given to 1-n-butylimidazolium, 1-methylimidazolium, 2-methylpyridinium, 2-ethylpyridinium, 1-butyl-3-methylimidazolium and 1-ethyl-3-methylimidazolium.

Further suitable cations are quaternary ammonium ions of the formula (II)

NRR$^a$R$^b$R$^{c+}$ (II)

and quaternary phosphonium ions of the formula (III)

PRR$^a$R$^b$R$^{c+}$ (III), $R^a$, $R^b$ and $R^c$ are each, independently of one another, $C_1$-$C_{18}$-alkyl, $C_2$-$C_{18}$-alkyl which may be interrupted by one or more nonadjacent oxygen and/or sulfur atoms and/or one or more substituted or unsubstituted imino groups, $C_6$-$C_{14}$-aryl or $C_5$-$C_{12}$cycloalkyl or 5-methoxy-3-oxapentyl, 8-methoxy-3,6-dioxaoctyl, 11-methoxy-3,6,9-trioxaundecyl, 7-methoxy-4-oxaheptyl, 11-methoxy-4,8-dioxaundecyl, 15-methoxy-4,8,12-trioxapentadecyl, 9-methoxy-5-oxanonyl, 14-methoxy-5,10-oxatetradecyl, 5-ethoxy-3-oxapentyl, 8-ethoxy-3,6-dioxaoctyl, 11-ethoxy-3,6,9-trioxaundecyl, 7-ethoxy-4-oxaheptyl, 11-ethoxy-4,8-dioxaundecyl, 15-ethoxy-4,8,12-trioxapentadecyl, 9-ethoxy-5-oxanonyl or 14-ethoxy-5,10-oxatetradecyl or a five- to six-membered, oxygen-, nitrogen- and/or sulfur-comprising heterocycle or two of them together form an unsaturated, saturated or aromatic ring which may be interrupted by one or more oxygen and/or sulfur atoms and/or one or more substituted or unsubstituted imino groups, where the radicals mentioned may each be substituted by functional groups, aryl, alkyl, aryloxyl, alkyloxy, halogen, heteroatoms and/or heterocycles, with the proviso that at least two of the three radicals $R^a$, $R^b$ and $R^c$ are different and the radicals $R^a$, $R^b$ and $R^c$ together have at least 8, preferably at least 10, particularly preferably at least 12 and very particularly preferably at least 13, carbon atoms.

Here, R is hydrogen or a $C_1$-$C_{18}$-alkyl radical, preferably a $C_1$-$C_{10}$-alkyl radical, particularly preferably a $C_1$-$C_6$-alkyl radical, for example methyl, ethyl, n-propyl, isopropyl, n-butyl, sec-butyl, tert-butyl, n-pentyl (n-amyl), 2-pentyl (sec-amyl), 3-pentyl, 2,2-dimethylprop-1-yl (neopentyl) and n-hexyl, very particularly preferably methyl.

Preference is given to $R^a$, $R^b$ and $R^c$ each being, independently of one another, $C_1$-$C_{18}$-alkyl, $C_6$-$C_{12}$-aryl or $C_5$-$C_{12}$-cycloalkyl, particularly preferably $C_1$-$C_{18}$-alkyl, where the radicals mentioned may each be substituted by functional groups, aryl, alkyl, aryloxy, alkyloxy, halogen, heteroatoms and/or heterocycles.

Examples of the respective groups have been given above.

The radicals $R^a$, $R^b$ and $R^c$ are preferably methyl, ethyl, n-propyl, isopropyl, n-butyl, sec-butyl, tert-butyl, n-pentyl (n-amyl), 2-pentyl (sec-amyl), 3-pentyl, 2,2-dimethylprop-1-yl (neopentyl), n-hexyl, n-heptyl, n-octyl, isooctyl, 2-ethylhexyl, 1,1-dimethylpropyl, 1,1-dimethylbutyl, benzyl, 1-phenylethyl, 2-phenylethyl, (α,(α-dimethylbenzyl, phenyl, tolyl, xylyl, α-naphthyl, β-naphthyl, cyclopentyl or cyclohexyl.

If two radicals $R^a$, $R^b$ and $R^c$ form a chain, this can be, for example, 1,4-butylene or 1,5-pentylene.

Examples of tertiary amines from which the quaternary ammonium ions of the general formula (II) are derived by quaternization by the abovementioned radicals R are diethyl-n-butylamine, diethyl-tert-butylamine, diethyl-n-pentylamine, diethylhexylamine, diethyloctylamine, diethyl-(2-ethylhexyl)amine, di-n-propylbutylamine, di-n-propyl-n-pentylamine, di-n-propylhexylamine, di-n-propyloctylamine, di-n-propyl(2-ethylhexyl)amine, diisopropylethylamine, diisopropyl-n-propylamine, diisopropylbutyl-amine, diisopropylpentylamine, diisopropylhexylamine, diisopropyloctylamine, diisopropyl(2-ethylhexyl)amine, di-n-butylethylamine, di-n-butyl-n-propylamine, di-n-butyl-n-pentylamine, di-n-butylhexylamine, di-n-butyloctylamine, di-n-butyl(2-ethylhexyl)amine, N-n-butylpyrrolidine, N-sec-butylpyrrolidine, N-tert-butylpyrrolidine, N-n-pentylpyrrolidine, N,N-dimethylcyclohexylamine, N,N-diethylcyclohexylamlne, N,N-di-n-butylcyclohexylamine, N-n-propylpiperidine, N-isopropylpiperidine, N-n-butylpiperidine, N-sec-butylpiperidine, N-tert-butylpiperidine, N-n-pentylpiperidine, N-n-butylmorpholine, N-sec-butylmorpholine, N-tert-butylmorpholine, N-n-pentylmorpholine, N-benzyl-N-ethylaniline, N-benzyl-N-n-propylaniline, N-benzyl-N-isopropylaniline, N-benzyl-N-n-butylaniline, N,N-dimethyl-p-toluidine, N,N-diethyl-p-toluidine, N,N-di-n butyl-p-toluidine, diethylbenzylamine, di-n-propylbenzylamine, di-n-butylbenzylamine, diethylphenylamine, di-n-propylphenylamine and di-n-butylphenylamine.

Preferred tertiary amines (II) are diisopropylethylamine, diethyl-tert-butylamine, diiso-propylbutylamine, di-n-butyl-n-pentylamine. N,N-di-n-butylcyclohexylamine and tertiary amines derived from pentyl isomers.

Particularly preferred tertiary amines are di-n-butyl-n-pentylamine and tertiary amines derived from pentyl isomers. A further preferred tertiary amine which has three identical radicals is triallylamine.

Further suitable cations are guanidinium ions of the general formula (III)

(III)

and quinolinium ions of the general formula (IV)

(IV)

where
R is as defined above,
and the radicals $R^a$ to $R^e$ are each, independently of one another, a carbon-comprising organic, saturated or unsaturated, acyclic or cyclic, aliphatic, aromatic or araliphatic radical which has from 1 to 20 carbon atoms and may be unsubstituted or interrupted or substituted by from 1 to 5 heteroatoms or functional groups, where the radicals $R^a$ and $R^c$ may also, independently of one another, be hydrogen; or the radicals $R^a$ and $R^b$ together and/or $R^c$ and $R^d$ together, in each case independently of one another, form a divalent, carbon-comprising organic, saturated or unsaturated, acyclic or cyclic, aliphatic, aromatic or araliphatic radical which has from 1 to 30 carbon atoms and may be unsubstituted or interrupted or substituted by from 1 to 5 heteroatoms or functional groups and the remaining radicals/the remaining radical are/is as defined above; or the radicals $R^b$ and $R^c$ together form a divalent, carbon-comprising organic, saturated or unsaturated, acyclic or cyclic, aliphatic, aromatic or araliphatic radical which has from 1 to 30 carbon atoms and may be unsubstituted or interrupted or substituted by from 1 to 5 heteroatoms or functional groups and the remaining radicals are as defined above. Otherwise, the radicals $R^a$-$R^e$ have the meanings given above for $R^a$-$R^c$.

Particularly preferred quinolinium ions (IV) are those in which $R^c$ is selected from among hydrogen, methyl, ethyl, acetyl, 5-methoxy-3-oxapentyl, 8-methoxy-3,6-dioxaoctyl, 11-methoxy-3,6,9-trioxaundecyl, 7-methoxy-4-oxaheptyl, 11-methoxy-4,8-dioxaundecyl, 15-methoxy-4,8,12-trioxapentadecyl, 9-methoxy-5-oxanonyl, 14-methoxy-5,10-oxatetradecyl, 5-ethoxy-3-oxapentyl, 8-ethoxy-3,6-dioxaoctyl, 11-ethoxy-3,6,9-trioxaundecyl, 7-ethoxy-4-oxaheptyl, 11-ethoxy-4,8-dioxaundecyl, 15-ethoxy-4,8,12-trioxapentadecyl, 9-ethoxy-5-oxanonyl or 14-ethoxy-5,10-oxatetradecyl.

As anions, it is in principle possible to use all anions. The anion $[Y]^{-n}$ of the ionic liquid is, for example, selected from among the group of halides and halogen-comprising compounds of the formulae:

$F^-$, $Cl^-$, $Br^-$, $I^-$, $BF_4^-$, $PF_6^-$, $AlCl_4^-$, $Al_2Cl_7^-$, $Al_3Cl_{10}^-$, $AlBr_4^-$, $FeCl_4^-$, $BCl_4^-$, $SbF_6^-$, $AsF_6^-$, $ZnCl_3^-$, $SnCl_3^-$, $CuCl_2^-$, $CF_3SO_3^-$, $(CF_3SO_3)_2N^-$, $CF_3CO_2^-$, $CCl_3CO_2^-$, $CN^-$, $SCN^-$, $OCN^-$ the group of sulfates, sulfites and sulfonates of the general formulae:

$SO_4^{2-}$, $HSO_4^-$, $SO_3^{2-}$, $HSO_3^-$, $R^aOSO_3^-$, $R^aSO_3^-$ the group of phosphates of the general formulae:

$PO_4^{3-}$, $HPO_4^{2-}$, $H_2PO_4^-$, $R^aPO_4^{2-}$, $HR^aPO_4^-$, $R^aR^bPO_4^-$ the group of phosphonates and phosphinates of the general formulae:

$R^aHPO_3^-$, $R^aR^bPO_2^-$, $R^aR^bPO_3^-$ the group of phosphites of the general formulae:

$PO_3^{3-}$, $HPO_3^{2-}$, $H_2PO_3^-$, $R^aPO_3^{2-}$, $R^aHPO_3^-$, $R^aR^bPO_3^-$ the group of phosphonites and phosphinites of the general formulae:

$R^aR^bPO_2^-$, $R^aHPO_2^-$, $R^aR^bPO^-$, $R^aHPO^-$ the group of carboxylic acids of the general formula:

$R^aCOO-$ the group of borates of the general formulae:

$BO_3^{3-}$, $HBO_3^{2-}$, $H_2BO_3^-$, $R^aR^bBO_3^-$, $R^aHBO_3^-$, $R^aBO_3^{2-}$, $B(OR^a)(OR^b)(OR^c)(OR^d)-$, $B(HSO_4)^-$, $B(R^aSO4)^-$ the group of boronates of the general formulae:

$R^aBO_2^{2-}$, $R^aR^bBO^-$ the group of carbonates and carbonic esters of the general formulae:

$HCO_3^-$, $CO_3^{2-}$, $R^aCO_3^-$ the group of silicates and salicic esters of the general formulae:

$SiO_4^{4-}$, $HSiO_4^{3-}$, $H_2SiO_4^{2-}$, $H_3SiO_4^-$, $R^aSiO_4^{3-}$, $R^aR^bSiO_4^{2-}$, $R^aR^bR^cSiO_4^-$; $HR^aSiO_4^{2-}$, $H_2R^aSiO_4^-$, $HR^aR^bSiO_4^-$ the group of alkylsilane and arylsilane salts of the general formulae:

$R^aSiO_3^{3-}$, $R^aR^bSiO_2^{2-}$, $R^aR^bR^cSiO_3^{2-}$, $R^aR^bR^cSiO_3^-$, $R^aR^bR^cSiO_2^-$, $R^aR^bSiO_3^{2-}$ the group of carboximides, bis(sulfonyl)imides and sulfonylimides of the general formulae:

the group of alkoxides and aryloxides of the general formula:

$R^aO-$ the group of complex metal ions such as $Fe(CN)_6^{3-}$, $Fe(CN)_4^{4-}$, $MnO_4^-$, $Fe(CO)_4^-$ Here, $R^a$, $R^b$, $R^c$ and $R^d$ are each, independently of one another, hydrogen, $C_1$-$C_{18}$-alkyl, $C_2$-$C_{18}$-alkyl which may be interrupted by one or more nonadjacent oxygen and/or sulfur atoms and/or one or more substituted or unsubstituted imino groups, $C_6$-$C_{14}$-aryl, $C_5$-$C_{12}$-cycloalkyl or a five- to six-membered, oxygen-, nitrogen- and/or sulfur-comprising heterocycle, where two of them may together form an unsaturated, saturated or aromatic ring which may be interrupted by one or more oxygen and/or sulfur atoms and/or one or more substituted or unsubstituted imino groups, where the radicals mentioned may each be additionally substituted by functional groups, aryl, alkyl, aryloxy, alkyloxy halogen, heteroatoms and/or heterocycles.

Here, $C_1$-$C_{18}$-alkyl which may be substituted by functional groups, aryl, alkyl, aryloxy, alkyloxy, halogen, heteroatoms and/or heterocycles is, for example, methyl, ethyl, propyl, isopropyl, n-butyl, sec-butyl, tert-butyl, pentyl, hexyl, heptyl, octyl, 2-ethylhexyl, 2,4,4-trimethylpentyl, decyl, dodecyl, tetradecyl, heptadecyl, octadecyl, 1,1-dimethylpropyl, 1,1-dimethylbutyl, 1,1,3,3-tetramethylbutyl, benzyl, 1-phenylethyl, α,α-dimethylbenzyl, benzhydryl, p-tolylmethyl, 1-(p-butylphenyl)ethyl, p-chlorobenzyl, 2,4-dichlorobenzyl, p-methoxybenzyl, m-ethoxybenzyl, 2-cyanoethyl, 2-cyanopropyl, 2-methoxycarbonylethyl, 2 ethoxycarbonylethyl, 2-butoxycarbonylpropyl, 1,2-di(methoxycarbonyl)ethyl, 2-methoxyethyl, 2-ethoxyethyl, 2-butoxyethyl, diethoxymethyl, diethoxyethyl, 1,3-dioxolan-2-yl, 1,3-dioxan-2-yl, 2-methyl-1,3-dioxolan-2-yl, 4-methyl-1,3-dioxolan-2-yl, 2-isopropoxyethyl, 2-butoxypropyl, 2-octyloxyethyl, chloromethyl, trichloromethyl, trifluoromethyl, 1,1-dimethyl-2-chloroethyl, 2-methoxyisopropyl, 2-ethoxyethyl, butylthiomethyl, 2-dodecylthioethyl, 2-phenylthioethyl, 2,2,2-trifluoroethyl, 2-hydroxyethyl, 2-hydroxypropyl, 3-hydroxypropyl, 4-hydroxybutyl, 6-hydroxyhexyl, 2-aminoethyl, 2-aminopropyl, 3-aminopropyl, 4-aminobutyl, 6-aminohexyl, 2-methylaminoethyl, 2-methylaminopropyl, 3-methylaminopropyl, 4-methylaminobutyl, 6-methylaminohexyl, 2-dimethylaminoethyl, 2-dimethylaminopropyl, 3-dimethylaminopropyl, 4-dimethylaminobutyl, 6-dimethylaminohexyl, 2-hydroxy-2,2-dimethylethyl, 2-phenoxyethyl, 2-phenoxypropyl, 3-phenoxypropyl, 4-phenoxybutyl, 6-phenoxyhexyl, 2-methoxyethyl, 2-methoxypropyl, 3-methoxypropyl, 4-methoxybutyl 6-methoxyhexyl, 2-ethoxyethyl, 2-ethoxypropyl, 3-ethoxypropyl, 4-ethoxybutyl or 6-ethoxyhexyl.

$C_2$-$C_{18}$-alkyl which may be interrupted by one or more nonadjacent oxygen and/or sulfur atoms and/or one or more substituted or unsubstituted imino groups is, for example, 5-hydroxy-3-oxapentyl, 8-hydroxy-3,6-dioxaoctyl, H-hydroxy-3,6,9-trioxaundecyl, 7-hydroxy-4-oxaheptyl, 11-hydroxy-4,8-dioxaundecyl, 15-hydroxy-4,8,12-trioxapentadecyl, 9-hydroxy-5-oxanonyl, 14-hydroxy-5,10-oxatetradecyl, 5-methoxy-3-oxapentyl, 8-methoxy-3,6-dioxaoctyl, 11-methoxy-3,6,9-trioxaundecyl, 7-methoxy-4-oxaheptyl, 11-methoxy-4,8-dioxaundecyl, 15-methoxy-4,8,12-trioxapentadecyl, 9-methoxy-5-oxanonyl, 14-methoxy-5,10-oxatetradecyl, 5-ethoxy-3-oxapentyl, 8-ethoxy-3,6-dioxaoctyl, 11-ethoxy-3,6,9-trioxaundecyl, 7-ethoxy-4-oxaheptyl, 11-ethoxy-4,8-dioxaundecyl, 15-ethoxy-4,8,12-trioxapentadecyl, 9-ethoxy-5-oxanonyl or 14-ethoxy-5,10-oxatetradecyl.

If two radicals form a ring, they can together form as fused-on building block, for example, 1,3-propylene, 1,4-butylene, 2-oxa-1,3-propylene, 1-oxa-1,3-propylene, 2-oxa-1,3-propenylene, 1-aza-1,3-propenylene, 1-$C_1$-$C_4$-alkyl-1-aza-1,3-propenylene, 1,4-buta-1,3-dienylene, 1-aza-1,4-buta-1,3-dienylene or 2-aza-1,4-buta-1,3-dienylene.

The number of nonadjacent oxygen and/or sulfur atoms and/or imino groups is in principle not subject to any restrictions or is automatically restricted by the size of the radical or the cyclic building block. In general, there will be no more than 5 in the respective radical, preferably no more than 4 and very particularly preferably no more than 3. Furthermore, there is generally at least one carbon atom, preferably at least two carbon atoms, between any two heteroatoms.

Substituted and unsubstituted imino groups can be, for example, imino, methylimino, isopropylimino, n-butylimino or tert-butylimino.

For the purposes of the present invention, the term "functional groups" refers, for example, to the following: carboxy, carboxamide, hydroxy, di($C_1$-$C_4$-alkyl)amino, $C_1$-$C_4$-alkyloxycarbonyl, cyano or $C_1$-$C_4$-alkyloxy. Here, $C_1$-$C_4$-alkyl is methyl, ethyl, propyl, isopropyl, n-butyl, sec-butyl or tert-butyl.

$C_6$-$C_{14}$-Aryl which may be substituted by functional groups, aryl, alkyl, aryloxy, alkyloxy, halogen, heteroatoms and/or heterocycles is, for example, phenyl, tolyl, xylyl, α-naphthyl, β-naphthyl, 4-diphenylyl, chlorophenyl, dichlorophenyl, trichlorophenyl, difluorophenyl, methylphenyl, dimethylphenyl, trimethylphenyl, ethylphenyl, diethylphenyl, isopropylphenyl, tert-butylphenyl, dodecylphenyl, methoxyphenyl, dimethoxyphenyl, ethoxyphenyl, hexyloxyphenyl, methylnaphthyl, isopropylnaphthyl, chloronaphthyl, ethoxynaphthyl, 2,6-dimethylphenyl, 2,4,6-trimethylphenyl, 2,6-dimethoxyphenyl, 2,6-dichlorophenyl, 4-bromophenyl, 2- or 4-nitrophenyl, 2,4- or 2,6-dinitrophenyl, 4-dimethylaminophenyl, 4-acetylphenyl, methoxyethylphenyl or ethoxymethylphenyl.

$C_5$-$C_{12}$-Cycloalkyl which may be substituted by functional groups, aryl, alkyl, aryloxy, halogen, heteroatoms and/or heterocycles is, for example, cyclopentyl, cyclohexyl, cyclooctyl, cyclododecyl, methylcyclopentyl, dimethylcyclopentyl, methylcyclohexyl, dimethylcyclohexyl, diethylcyclohexyl, butylcyclohexyl, methoxycyclohexyl, dimethoxycyclohexyl, diethoxycyclohexyl, butylthiocyclohexyl, chlorocyclohexyl, dichlorocyclohexyl, dichlorocyclopentyl or a saturated or unsaturated bicyclic system such as norbornyl or norbornenyl.

A five- or six-membered, oxygen-, nitrogen- and/or sulfur-comprising heterocycle is, for example, furyl, thiophenyl, pyrryl, pyridyl, indolyl, benzoxazolyl, dioxolyl, dioxyl, benzimidazolyl, benzothiazolyl, dimethylpyridyl, methylquinolyl, dimethylpyrryl, methoxyfuryl, dimethoxypyridyl, difluoropyridyl, methylthiophenyl, isopropylthiophenyl or tert-butylthiophenyl.

Very particularly preferred anions are chloride, bromide, iodide, thiocyanate, acetate, $C_1$-$C_4$-alkylsulfates, methanesulfonates, tosylate, $C_1$-$C_4$-dialkylphosphates, hydrogensulfate and tetrachloroaluminate.

Both cations and anions are present in the ionic liquid. Within the ionic liquid, a proton or an alkyl radical is transferred from the cation to the anion. This forms two uncharged molecules. There is thus an equilibrium in which anions, cations and the two uncharged molecules formed therefrom are present.

The invention is illustrated by the following examples.

EXAMPLES

Example 1

TABLE 1

| Retention time [min.] | Height [a.u.] | Area [a.u.] | Area-% |
|---|---|---|---|
| 3.227 | 122.330 | 384.069 | 3.393 |
| 4.673 | 1.113 | 7.426 | 0.066 |
| 5.333 | 0.433 | 2.539 | 0.022 |
| 6.253 | 0.547 | 4.317 | 0.038 |
| 7.660 | 634.181 | 10.922,762 | 96.481 |

Figure 1:
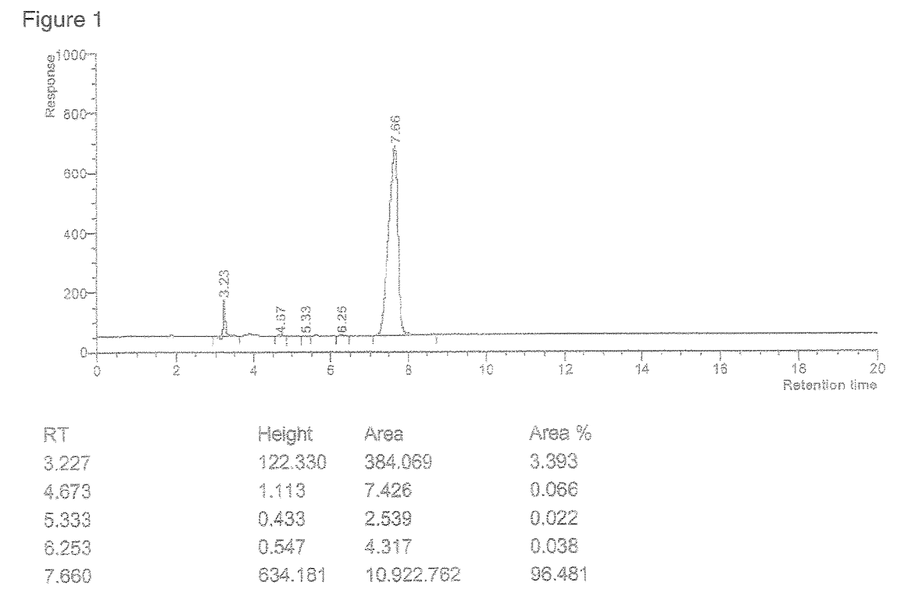
FIG. 1 shows an associated chromatogram of the ionic liquid purified in instant Example 1.

The ionic liquid methylimidazolium chloride was used as solvent in the preparation of a chlorinated hydrocarbon, with contaminated methylimidazolium chloride being obtained. The contaminated methylimidazolium chloride comprised essentially nonvolatile or only very slightly volatile impurities. According to HPLC analysis, the mixture comprised 96.5% by area of methylimidazolium chloride and 3.5% by area of various impurities. The associated chromatogram is shown in FIG. 1 and table 1. 410 g of contaminated methylimidazolium chloride was placed in the liquid state in a suspension crystallizer at 90° C. under atmospheric pressure.

As suspension crystallizer, use was made of a 1 liter stirred glass vessel which was stirred by means of an anchor stirrer (diameter: 90 mm) at about 100 rpm. The glass vessel had a heating/cooling jacket which was heated/cooled by means of water and a thermostat.

Figure 2:
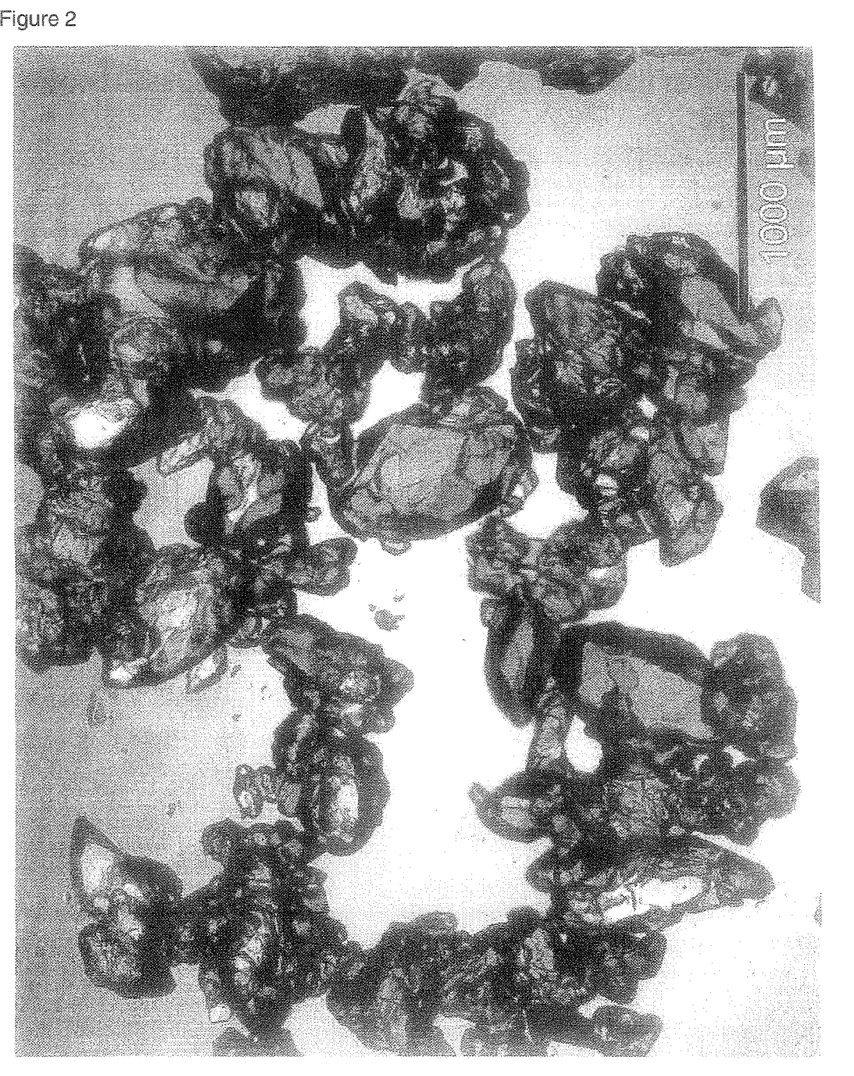
FIG. 2 shows crystals produced by instant Example 1.
Figure 3:
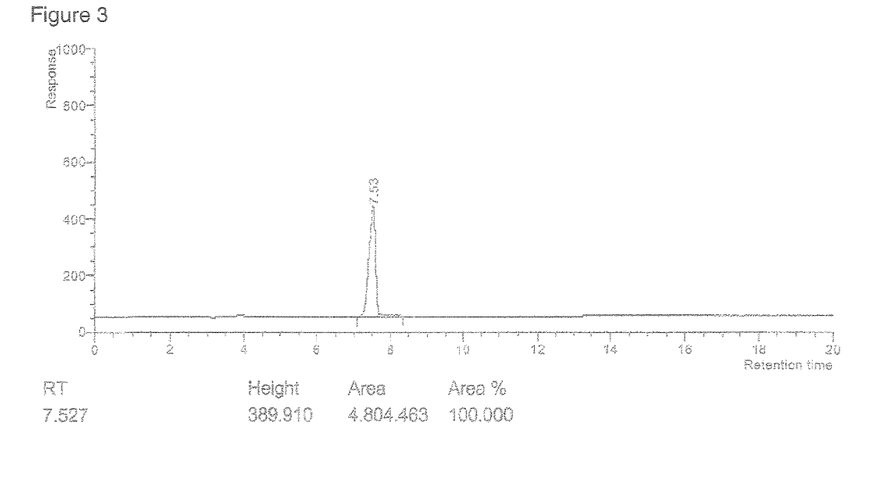
FIG. 3 shows an associated chromatogram of the crystals produced in instant Example 1.

The liquid starting mixture was firstly cooled to about 70° C. and then admixed with 1 g of solid. The thickening suspension was subsequently heated to about 80° C. until only a small amount of seed crystals was present in the suspension. A controlled, slow cooling of the seeded mixture was then carried out at a cooling rate of 0.63 K/h over a period of 14 hours. A crystal suspension comprising coarse crystals which had a particle size in the range from 100 to 1500 μm and could easily be separated off was formed by means of the cooling crystallization. These crystals are shown in FIG. 2. To separate the crystals from the residual liquid, 60 ml of suspension were centrifuged for three minutes at 2000 rpm in a laboratory screen basket centrifuge which had been preheated to a temperature of 80° C. After centrifugation, 28.6 g of crystals were taken from the screen basket. According to HPLC analysis, the crystals comprised 100% by area of methylimidazolium chloride. The impurities present in the contaminated starting mixture were no longer found in the crystals. The associated chromatogram is shown in FIG. 3 and table 2.

Example 2

TABLE 2

| Retention time [min.] | Height [a.u.] | Area [a.u.] | Area-% |
|---|---|---|---|
| 7.527 | 389.910 | 4.804.483 | 100.000 |

The procedure customary in the zone melting of organic, crystallizing substances was employed. Here, the organic, crystallizing substance is introduced in melt form into a glass tube of defined length and diameter. After crystallization of the melt by cooling to room temperature in the upright tube, the tube opening is melted shut in the remaining empty space at the upper end. The crystallized bar of the substance is completely separated from ambient air in the sealed glass tube so that the influence of atmospheric oxygen and atmospheric moisture is prevented. The filled glass tube is hung in the horizontal zone melting apparatus and the previously programmed transport or drawing program and temperature-controlled heating and cooling zones are commenced. The formation of solid and liquid regions along the product enclosed in the glass tube occurs as a result of the alternate arrangement of the cooling and heating zones. Slow drawing of the tube through the heating and cooling regions results in progressive melting and crystallization and thus "migration" of the zones, which effects accumulation of the impurities which dissolve better in the melt.

The result is accumulation of the impurities at the end of the tube and high purity of the crystallized region at the beginning of the tube.

The apparatus described in experiments had 20 heating zones and 21 cooling zones. For optimal utilization of these 20 heating zones, a 5 zone interval was carried out, i.e. the slow crystallization drawing process was carried out over a stretch of 4 heating zones and the tube was subsequently transported back quickly to the starting position, from which the tube was then again slowly drawn. In this way, 5 intervals effect the accumulation of impurities over the entire length of the zone melting tube, in which 16 heating zones are continually effective.

The operating conditions were as follows: diameter of the zone melting tube: 9 mm internal, wall thickness: 1 mm, fill height or length of the bar of the substance: 560 mm, amount used: about 35 g, temperature of the cooling zones: about 25° C. temperature of the heating zones: about 175° C., drawing velocity during crystallization: 15 mm/h; during pulling back: 5 mm/sec.

In the above-described zone melting apparatus, 1-ethyl-3-methylimidazolium chloride having a purity of 97% by weight was able to be brought to a purity of 99.9% by weight using the reaction conditions described. In the region enriched with the impurities at the end of the tube, the purity of the 1-ethyl-3-methylimidazolium chloride was 95.0% by weight.

The invention claimed is:

1. A process for purifying an ionic liquid, which comprises (a) partially crystallizing the ionic liquid from a melt of the ionic liquid until at least 5% by weight and not more than 90% by weight of the ionic liquid has crystallized out, and (b) separating the crystals crystallized out from a residual melt, wherein the crystals comprise at least 85% by weight of a purified ionic liquid.

2. The process according to claim 1, wherein the partial crystallization is carried out discontinuously.

3. The process according to claim 1, wherein the partial crystallization is carried out continuously.

4. The process according to claim 1, wherein the partial crystallization is carried out statically or dynamically.

5. The process according to claim 4, wherein the partial crystallization is carried out as a layer or suspension crystallization.

6. The process according to claim 1, wherein the partial crystallization is carried out in a plurality of stages.

7. The process according to claim 6, wherein the partial crystallization is carried out as a countercurrent crystallization.

8. The process according to claim 1, wherein the partial crystallization is carried out as a zone melting process.

* * * * *

UNITED STATES PATENT AND TRADEMARK OFFICE
CERTIFICATE OF CORRECTION

PATENT NO. : 8,231,792 B2  Page 1 of 1
APPLICATION NO. : 11/720937
DATED : July 31, 2012
INVENTOR(S) : Martin Fiene et al.

It is certified that error appears in the above-identified patent and that said Letters Patent is hereby corrected as shown below:

On the title page, Item(86), the Application Filing Date should read:

--(86)  PCT No.:  PCT/EP2005/013061

§ 371 (c)(1),
(2), (4) Date: Feb. 8, 2008--

Signed and Sealed this
Twenty-fifth Day of September, 2012

David J. Kappos
*Director of the United States Patent and Trademark Office*